(12) United States Patent
Kaneko et al.

(10) Patent No.: US 8,840,356 B2
(45) Date of Patent: Sep. 23, 2014

(54) WORKPIECE TRANSPORTING APPARATUS AND METHOD FOR TRANSPORTING THE SAME

(75) Inventors: Masayuki Kaneko, Tochigi (JP); Taro Nakamura, Tochigi (JP); Takayuki Hasegawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 406 days.

(21) Appl. No.: 13/227,537

(22) Filed: Sep. 8, 2011

(65) Prior Publication Data

US 2012/0063873 A1    Mar. 15, 2012

(30) Foreign Application Priority Data

Sep. 9, 2010    (JP) .................................. 2010-201571

(51) Int. Cl.
*B25J 15/00*    (2006.01)

(52) U.S. Cl.
CPC .............. *B25J 901/31* (2013.01); *Y01S 901/31* (2013.01); *Y01S 901/41* (2013.01); *Y10S 901/02* (2013.01); *Y10S 901/30* (2013.01); *Y10S 901/31* (2013.01); *Y10S 901/41* (2013.01)
USPC ........... 414/736; 414/729; 414/730; 414/737; 414/738; 901/2; 901/30; 901/31; 901/41; 901/2

(58) Field of Classification Search
CPC ........ B23K 37/047; B23Q 7/047; B23Q 7/04; B23Q 3/1554; B25J 9/046; B25J 9/06; B25J 13/082; B25J 15/04; B25J 15/06; B25J 15/052; B25J 19/063; B28B 13/04; B66C 1/585; B66C 23/36; B66C 23/54; B66F 9/18; B66F 9/065; E02F 3/404
USPC ........ 414/729, 730, 736, 737, 738; 901/2, 30, 901/31, 41
See application file for complete search history.

(56) References Cited

U.S. PATENT DOCUMENTS 7,474,939 B2 *    1/2009    Oda et al. ...................... 700/245

FOREIGN PATENT DOCUMENTS

| JP | 06-255772 | 9/1994 |
| JP | 09-254071 | 9/1997 |
| JP | 2002-210689 | 7/2002 |
| JP | 2006-001009 | 1/2006 |
| JP | 2008-168406 | 7/2008 |

OTHER PUBLICATIONS

Japanese Office Action dated Sep. 5, 2013, 3 pages.

* cited by examiner

*Primary Examiner* — Gregory Adams
*Assistant Examiner* — Ronald Jarrett
(74) *Attorney, Agent, or Firm* — Rankin, Hill & Clark LLP

(57) ABSTRACT

A workpiece transporting apparatus includes a hand, a rotating portion for rotatably holding the hand, an arm provided in the hand and having one end provided at the rotating portion, and a holding portion provided in the hand and provided to another end of the arm for holding a workpiece, in which a center portion of the holding portion is disposed with a predetermined interval from an axial line extended from a rotational center of the rotating portion toward another end of the arm.

7 Claims, 5 Drawing Sheets

WORKPIECE TRANSPORTING APPARATUS AND METHOD FOR TRANSPORTING THE SAME

BACKGROUND OF THE INVENTION

1. Field of the Invention

The present invention relates to a workpiece transporting apparatus and a method for transporting the workpiece, in which a workpiece disposed in a carriage is held and transported by hand, and particularly relates to a technique in which interference between the hand and the carriage in transporting the workpiece can be avoided.

2. Related Art

A transporting apparatus is used in order to dispose a workpiece in a carriage and remove the workpiece therefrom. The transporting apparatus is provided with a robot such as a six-axis-type robot and a hand is mounted at a front end of a robot arm of the robot.

The hand is provided with an arm of which one end is rotatably provided to a rotating portion of the robot. A holding portion for holding the workpiece is provided at another end of the arm. The holding portion is provided with a hole-clamping portion of which, for example, a radially expandable portion abuts to the inner circumferential surface of a hole of the workpiece and holds the workpiece (for example, Japanese Patent Application, First Publication No. 9-254071).

SUMMARY OF THE INVENTION

Workpieces are arranged in the in-plane direction and are perpendicularly stacked via a pad in a carriage. When the center portion of the pad is deflected in a protruding shape toward the upper direction, the workpieces in the vicinity of sidewalls of the carriage incline toward each sidewall.

For example, as shown in FIG. 7, when the inclining workpiece W is held by a holding portion 4 of a hand 2, an arm 3 is inclined with respect to a sidewall D1 of a carriage D by rotating the arm 3 around a rotational axis O of a rotating portion 1 in order to insert a radially expandable portion of a hole clamping portion of the holding portion 4 into a hole H of the workpiece W. However, in this case, the arm 3 of the hand 2 interferes with the sidewall D1 of the carriage D, so that the workpiece W cannot be held by the holding portion 4.

Therefore, an object of the present invention is to provide a workpiece transporting apparatus and a method for transporting the same, in which the workpiece can be stably held by a holding portion in a case of an inclining condition of the workpiece in the vicinity of a sidewall of a carriage.

The present invention provides a workpiece transporting apparatus including a hand; a rotating portion for rotatably holding the hand; an arm provided in the hand and having one end provided to the rotating portion; and a holding portion provided in the hand and provided to another end of the arm for holding a workpiece; in which a center portion of the holding portion is disposed with a predetermined interval from an axial line extended from a rotational center of the rotating portion toward another end of the arm.

In the workpiece transporting apparatus of the present invention, since the center portion of the holding portion of the hand is disposed with the predetermined interval from the axial line of the arm extended from the rotational center of the rotating portion toward another end of the arm, when the workpiece disposed in the vicinity of the sidewall of the carriage is held by the holding portion, a distance between the arm and the sidewall can be large compared to a case in which the center portion of the holding portion is disposed on the axial line of the arm. Specifically, in a hand 12 shown in FIG. 6, an interval L between a centerline R of a holding portion 14 and an axial line P of an arm 13 is freely set, so that the distance between the arm 13 and the sidewall D1 of the carriage D can be widely set. Therefore, when the workpiece W disposed in the vicinity of the sidewall D1 of the carriage D is inclined, the arm 13 does not interfere with the sidewall D1 of the carriage D even if the arm 13 is inclined with respect to the sidewall D1 by rotating the arm 13 around a rotational axis O of a rotating portion 11.

In the workpiece transporting apparatus of the present invention, when the workpiece is disposed in the vicinity of the sidewall of the carriage, the holding portion can stably hold the workpiece. In particular, in an aspect in which the holding portion is provided with the hole clamping portion and holds the workpiece by abutting the radially expandable portion to the inner circumferential surface of the hole of the workpiece, the radially expandable portion can be stably inserted into the inner circumference of the hole of the workpiece, so that the above effect can be sufficiently obtained.

The workpiece transporting apparatus of the present invention can be applied with various structures. For example, a rotating mechanism for rotating the hand around the axial line may be provided between the rotating portion and the arm. If another means, such as a workpiece detecting means, is provided to the hand on the opposite side to the holding portion with respect to the axial line of the arm, and the workpiece disposed in the vicinity of the sidewall of the carriage is held, another means may interfere with another sidewall thereof. In the above aspect, when the hand is inserted into the carriage, the hand is arbitrarily rotated around the axial line by the rotating mechanism, so that the interference between another means and another sidewall of the carriage can be avoided.

The present invention provides a method for transporting the workpiece, in which a workpiece inclined in a carriage is held and transported using the workpiece transporting apparatus of the present invention, including: rotating the arm according to an inclining condition of the workpiece; thereby adjusting an inclining condition of the arm; and holding the workpiece by the holding portion.

The method for transporting the workpiece of the present invention can obtain the same effects as that of the workpiece transporting apparatus of the present invention.

According to the workpiece transporting apparatus and the method for transporting the same of the present invention, when the workpiece disposed in the vicinity of the sidewall of the carriage is inclined, the workpiece can be stably held by the holding portion.

BRIEF DESCRIPTION OF DRAWINGS

FIG. 2A and FIG. 2B are cross-sectional side views showing partial structures of the workpiece transporting apparatus shown in FIG. 1, wherein FIG. 2A is a cross-sectional side view showing a schematic structure of a hand device, and FIG. 2B is a cross-sectional side view in a perpendicular direction with respect to the structure in FIG. 2A showing a schematic structure of a portion of the hand device.

FIG. 5A and FIG. 5B are diagrams for explanation of function of a rotating mechanism of the workpiece transporting apparatus in accordance with the embodiment of the present invention, wherein FIG. 5A is a schematic plane view showing an example of the present invention using the rotating mechanism and FIG. 5B is a schematic plane view showing an example of a conventional technique not using the rotating mechanism.

DESCRIPTION OF PREFERRED EMBODIMENTS

1. Structure of Embodiment

Figure 1:
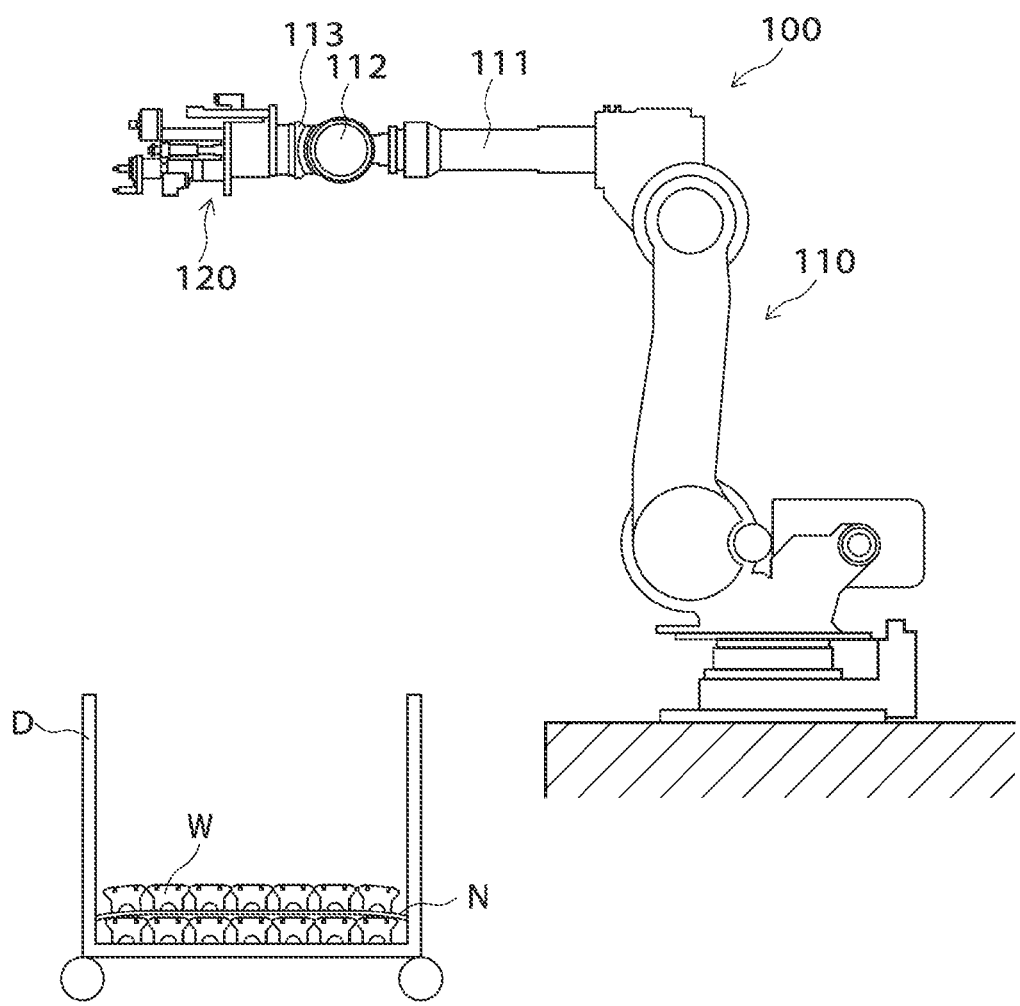
FIG. 1 is a schematic side view showing a total structure of a workpiece transporting apparatus in accordance with an embodiment of the present invention.
Figure 2A:
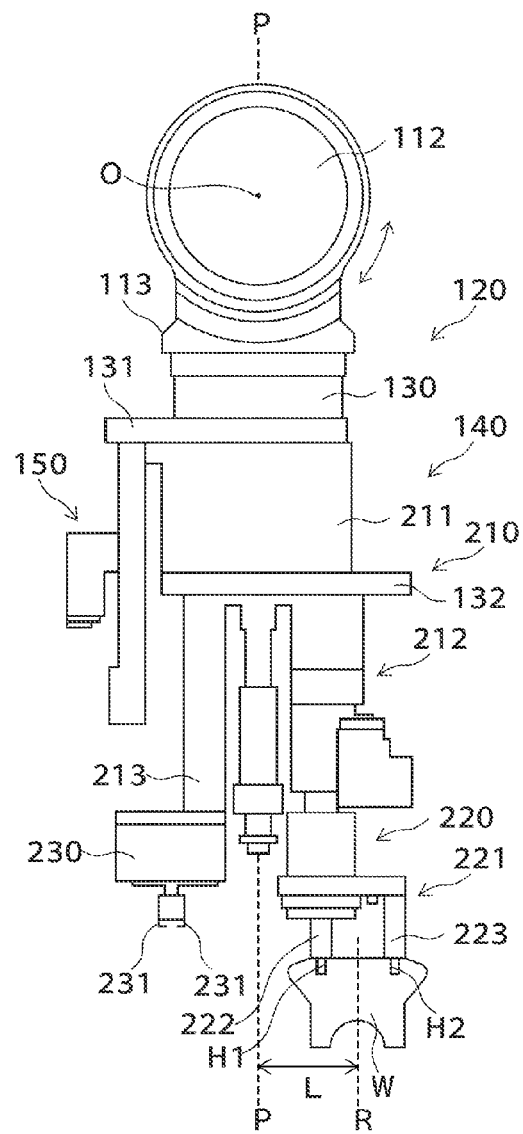
Figure 2B:
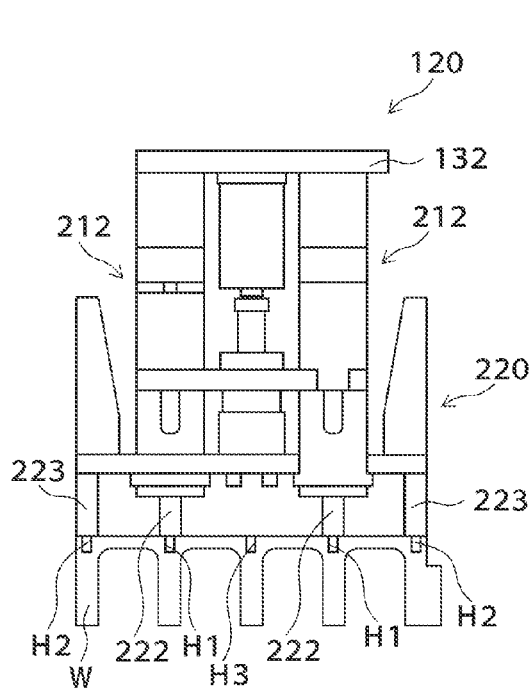
Figure 3:
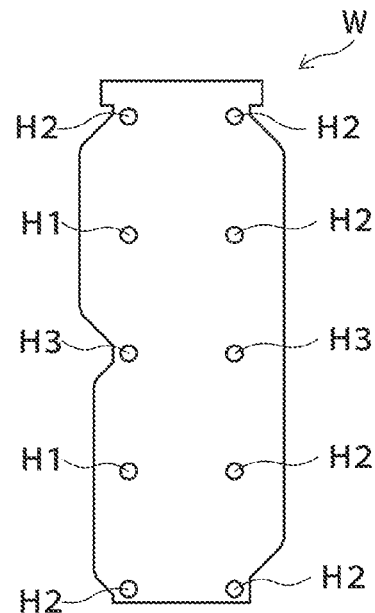
FIG. 3 is a diagram for explanation of the relationship of positions of a hole clamping portion and a guide pin in a holding portion of the workpiece transporting apparatus shown in FIGS. 2A and 2B, and is a plane view showing a schematic structure of a workpiece.

An embodiment of the present invention is explained with reference to the Figures hereinafter. FIG. 1 is a schematic side view showing a total structure of a workpiece transporting apparatus 100 in accordance with an embodiment of the present invention. FIG. 2A and FIG. 2B are cross-sectional side views showing partial structures of the workpiece transporting apparatus 100. FIG. 2A is a cross-sectional side view showing a schematic structure of a hand device 120, and FIG. 2B is a cross-sectional side view showing a schematic structure of a portion of the hand device 120. FIG. 2A is a cross-sectional view taken along a line parallel to an in-plane direction of rotation of the hand device 120 around a rotational axis O of a rotating portion 112, and FIG. 2B is a cross-sectional side view taken along a perpendicular surface with respect to the cross side section shown in FIG. 2A. FIG. 3 shows a schematic structure of a workpiece W and is a plane view showing each hole to which each portion of a holding portion 221 is inserted.

As shown in FIG. 1, the workpiece transporting apparatus 100 is, for example, an apparatus by which the workpiece W is removed from the inside of a carriage D. In the carriage D, the workpieces W are arranged in the in-plane direction and are perpendicularly stacked via a pad N. The workpiece transporting apparatus 100 is provided with a robot 110 such as a six-axes-type robot and the robot 110 is provided with a robot arm 111. A mounting portion 113 to which the hand device 120 is mounted is provided at the front end of the robot arm 111. The rotating portion 112 by which the hand device 120 is rotatably supported is provided to the robot arm 111.

For example, as shown in FIG. 2A and FIG. 2B, the hand device 120 is provided with a rotating mechanism 130 provided to the mounting portion 113. Furthermore, the hand device 120 is provided with a hand 140, and a workpiece-detecting portion 150, which are provided to the rotating mechanism 130 via a connecting member 131. The rotating mechanism 130 is a mechanism for rotating the hand 140 and the workpiece detecting portion 150 around an axial line P.

The hand 140 has a main hand 210, a workpiece holding hand 220 as a subhand and a pad holding hand 230. The main hand 210 has a first arm 211, a second arm 212, and a third arm 213. The arms 211 to 213 have, for example, piston-cylinder mechanisms and structures thereof are telescopic.

The upper end of the first arm 211 is connected to the rotating mechanism 130 via the connecting member 131. The upper ends of the second arm 212 and the third arm 213 are connected to the lower end of the first arm 211 via a connecting member 132. The upper end of the workpiece holding hand 220 is connected to the lower end of the second arm 212. The upper end of the pad holding hand 230 is connected to the lower end of the third arm 213.

A holding portion 221 for holding the workpiece W is provided to the lower end of the workpiece holding portion 220. The holding portion 221 has a hole clamping portion 222 and a guide pin 223. A radially expandable portion of which the radial dimension is increased by means such as a hydraulic pressure means is provided at the front end of the hole-clamping portion 222. In the hole-clamping portion 222, the radially expandable portion is expanded and abuts to the inner circumferential surface of a hole H1 of the workpiece W, so that the workpiece W is held. A pin for positioning is provided to the front end of the guide pin 223 and is inserted into a hole H2 of the workpiece W. The radially expandable portion of the hole clamping portion 222 and the pin of the guide pin 223 are not inserted into a hole H3 of the workpiece W.

In the present embodiment, as shown in FIG. 2A, the center of the holding portion 221 of the workpiece holding hand 220 is disposed with a distance from an axial line P extended from the rotational axis O of the rotating portion 112 toward another end of the first arm 211 of the main hand 210. Specifically, a centerline R of the holding portion 221 is disposed with a perpendicularly predetermined interval L with respect to the axial line P that is extended from the rotational axis O of the rotating portion 112 toward another end of the first arm 211. Furthermore, the workpiece holding portion 220 is disposed in a condition in which the structure thereof can be substantially set within, for example, a range in a width direction of the workpiece W shown in FIG. 2A and is set within, for example, a range in a longitudinal direction thereof shown in FIG. 2B.

Two L-shaped holding members 231 are rotatably provided to both edge of the lower end of the pad holding hand 230. Click portions are formed at front ends of the holding members 231. In the pad holding hand 230, the pad N is pinched by the click portions of the holding member 231 and is ejected to the outside of the carriage D.

The work-detecting portion 150 has a position detecting portion (for example, a two-dimensional camera) for detecting a position of the workpiece W in a plane parallel to a bottom surface of the carriage D and an inclination detecting portion (for example, a three-dimensional sensor) for detecting the inclination of the workpiece W. An inclination angle of the hand device 120 is adjusted by rotation thereof around the rotating portion 112 of the robot 110 and the adjustment is performed based on the data detected by the position detecting portion and the inclination detecting portion of the workpiece detecting portion 150.

2. Movement of Embodiment

Figure 4:
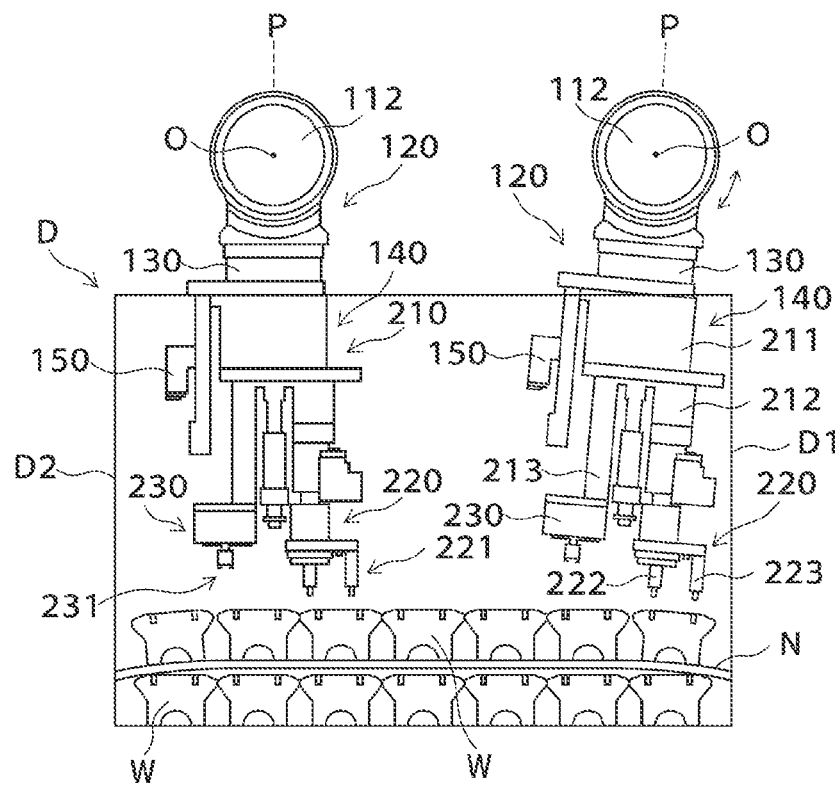
FIG. 4 is a cross-sectional side view showing a moving condition of the workpiece transporting apparatus in accordance with the embodiment of the present invention.
Figure 5A:
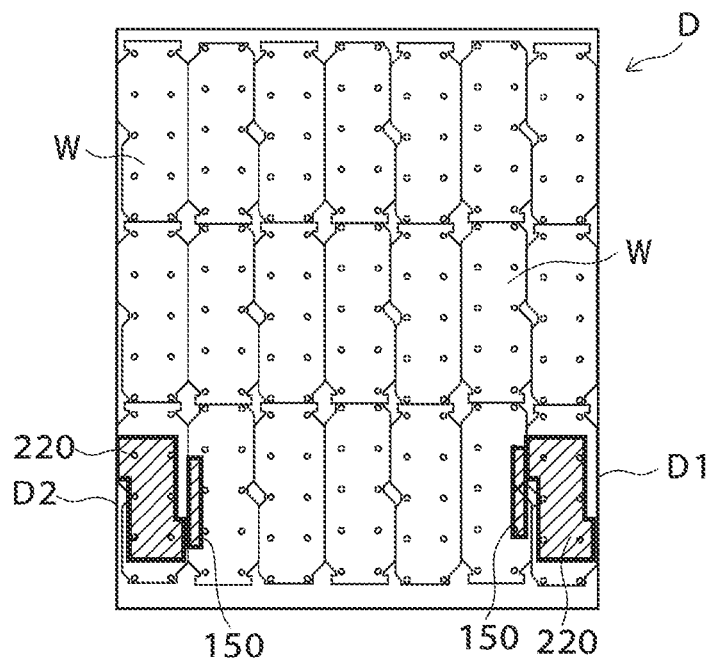
Figure 5B:
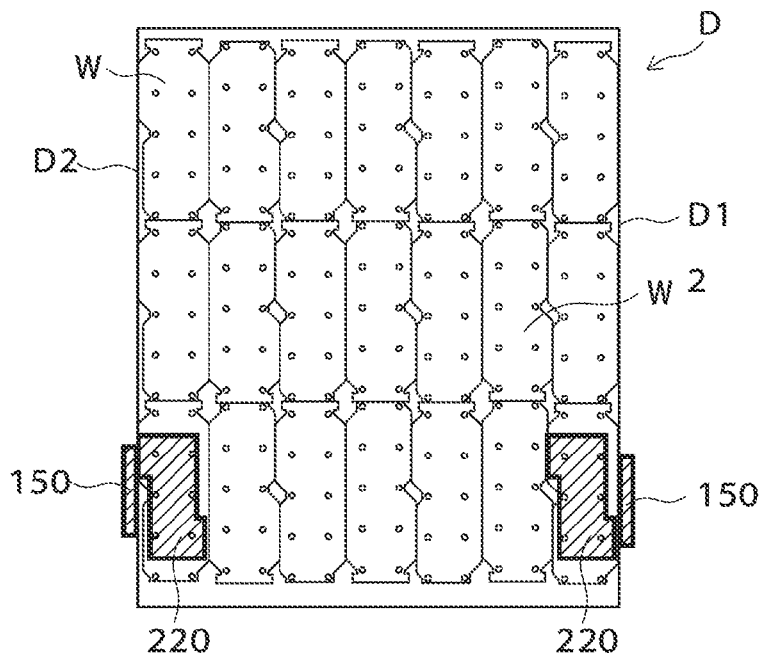
Figure 6:
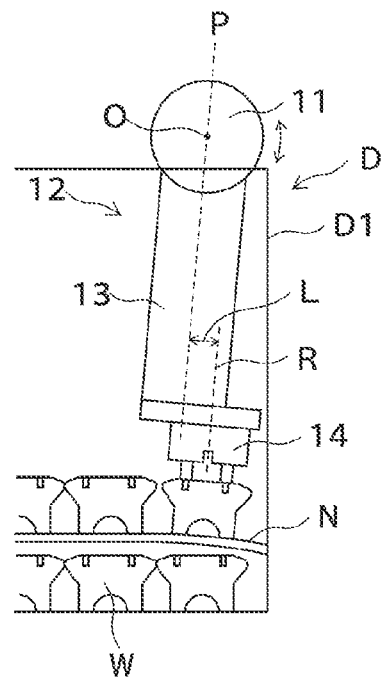
FIG. 6 is a diagram for explanation of movement of a specific example of the workpiece transporting apparatus of the present invention and is a cross-sectional side view showing a schematic structure of the hand.
Figure 7:
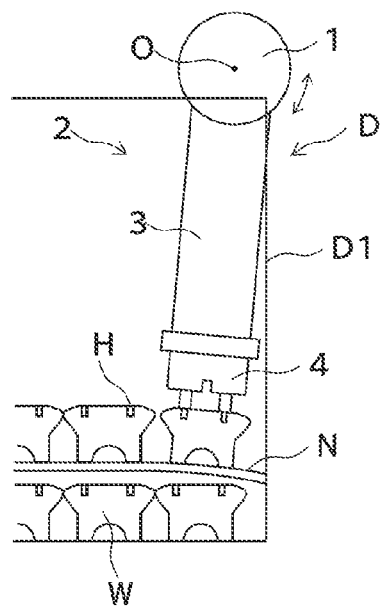
FIG. 7 is a diagram for explanation of a problem of movement of the specific example of the conventional workpiece transporting apparatus and is a cross-sectional side view showing the schematic structure of the hand.

Movements of the workpiece transporting apparatus 100 are explained hereinafter. FIG. 4 is a cross-sectional side view showing a moving condition of the workpiece transporting apparatus 100. FIGS. 5A and 5B are diagrams for explanation of functions of the rotating mechanism 130 of the workpiece transporting apparatus 100. FIG. 5A is a schematic plane view showing an example of the present invention using the rotating mechanism 130 and FIG. 5B is a schematic plane view showing an example of a conventional technique not using the rotating mechanism 130. Only the workpiece detecting portion 150 and the holding portion 220 are shown in FIGS. 5A and 5B, and these portions are simply shown therein.

In the workpiece transporting apparatus 100, relative positions of the hand 140 and the workpiece detecting portion 150 with respect to the carriage D are adjusted by the rotating mechanism 130 so that the hand device 120 does not interfere with sidewalls D1 and D2, and the hand device 120 is inserted into the carriage D. In this case, as shown in FIG. 4, when the hand device 120 is positioned in the vicinity of the sidewall D2, the workpiece detecting portion 150 can detect the position and the inclination of the workpiece W without interference with the sidewall D2.

In the hand 140, the first arm 211 of the main hand 210 rotates around the rotational axis O of the rotating portion 112 of the robot 110 based on the data of the position and the inclination of the workpiece W detected by the workpiece-detecting portion 150. By this movement, the first arm 211 and the second arm 212 are inclined, so that the inclination angle of the workpiece holding hand 220 can be adjusted and an inserting angle of each portion of the holding portion 221 with respect to each hole of the workpiece W is determined.

In the present embodiment, as shown in FIG. 2A, the centerline R on the center of the holding portion 221 of the workpiece holding hand 220 is positioned with the predetermined interval L from the axial line P extended from the rotational axis O of the rotating portion 112 toward another end of the first arm 211. Therefore, for example, when the workpiece W disposed in the vicinity of the sidewall D1 is inclined, as shown in FIG. 4, even if the upper end of the first arm 211 is inclined toward the sidewall D1, the first arm 211 does not interfere with the sidewall D1.

Specifically, in the hand 140, by suitably adjusting the interval L between the centerline R of the holding portion 221 and the axial line P of the first arm 211, distance between the first arm 211 and the sidewall D1 of the carriage D and distance between the second arm 212 and the sidewall D1 can be great. Therefore, when the workpiece W disposed in the vicinity of the sidewall D1 of the carriage D is inclined, the first arm 211 and the second arm 212 does not interfere with the sidewall D1 of the carriage D, even if the first arm 211 and the second arm 212 are inclined toward the sidewall D1 of the carriage D.

Next, the radially expandable portion of the hole clamping portion 222 is inserted into the hole H1 by suitably extension and retraction of the second arm 212 of the workpiece holding hand 220. Next, the radially expandable portion is expanded and abuts to the inner circumferential surface of the hole H1 of the workpiece W, so that the workpiece W is held. In this case, in the guide pin 223, the pin provided at the front end thereof is inserted into the hole H2 of the workpiece W. The workpiece W held in this condition is transported to the outside of the carriage D by the robot 110.

Furthermore, when the workpiece W disposed in the vicinity of the sidewall D2 of the carriage D is held, for example, as shown in FIG. 5B, the workpiece detecting portion 150 may interfere with the sidewall D2 of the carriage D. However, in the present embodiment, when the hand 140 is inserted into the inside of the carriage D, for example, as shown in FIG. 5A, the interference between the hand 140 and the sidewall D2 of the carriage D can be avoided by suitably rotating the hand device 120 around the axial line P.

The workpieces W disposed on the pad N are sequentially held by the hand 140 and are transported to the outside of the carriage D by the robot 110. When all workpieces W disposed on the pad N are transported therefrom, the pad N is ejected from the carriage D in a condition in which the pad N is pinched and held by the click portions of the holding member 231 of the pad holding portion 230. Next, each workpiece W is sequentially held by each portion of the hand device 120 in the same movement as the above movement, and is transported to the outside of the carriage D by the robot 110.

As explained above, in the present embodiment, when the workpiece W disposed in the vicinity of the sidewall D1 of the carriage D is inclined, even if the first arm 211 and the second arm 212 are inclined toward the sidewall D1 thereof, the first arm 211 and the second arm 212 do not interfere with the sidewall D1 of the carriage D, so that the workpiece W can be stably held by the holding portion 221.

In particular, in the embodiment in which the holding portion 221 has the hole clamping portion 222 and the workpiece W is held by abutting the radially expandable portion thereof to the inner circumferential surface of the hole H1 of the workpiece W, the radially expandable portion can be stably inserted into the hole H1, so that the above effect can be sufficiently obtained. Furthermore, when the hand device 120 is inserted into the inside of the carriage D, the interference between the workpiece detecting portion 150 and sidewall D2 of the carriage D can be avoided by rotation of the hand device 120 around the axial line P using the rotating mechanism 130.

What is claimed is:

1. A workpiece transporting apparatus, comprising:
   a hand;
   a rotating portion for rotatably holding the hand;
   a first arm attached to the hand and having one end provided to the rotating portion;
   a first holding portion attached to the hand via a telescopic second arm and disposed at an other end of the first arm for holding a workpiece;
   a second holding portion attached to the hand via a telescopic third arm and disposed at the other end of the first arm for holding a member other than the workpiece;
   wherein a center portion of the first holding portion is disposed with a predetermined interval from an axial line extended from a rotational center of the rotating portion toward the other end of the first arm, and
   a center portion of the second holding portion is disposed with a predetermined interval from the axial line at an opposite side of the first holding portion.

2. A workpiece transporting apparatus according to claim 1, wherein a rotating mechanism is provided between the rotating portion and the first arm in order to make the hand rotatable around the axial line.

3. A workpiece transporting apparatus according to claim 1, wherein the holding portion is provided with a hole clamping portion for holding the workpiece by abutting a radially expandable portion to an inner circumferential surface of a hole of the workpiece.

4. A workpiece transporting apparatus according to claim 2, wherein the holding portion is provided with a hole clamping portion for holding the workpiece by abutting a radially expandable portion to an inner circumferential surface of a hole of the workpiece.

5. A method for transporting a workpiece in which a workpiece inclining in a carriage is held and transported using the workpiece transporting apparatus according to claim 1, comprising:
   rotating the arm according to an inclining condition of the workpiece, thereby adjusting an inclining condition of the arm; and
   holding the workpiece by the holding portion.

6. A method for transporting a workpiece in which a workpiece inclining in a carriage is held and transported using the workpiece transporting apparatus according to claim 2, comprising:
- rotating the arm according to an inclining condition of the workpiece, thereby adjusting an inclining condition of the arm; and
- holding the workpiece by the holding portion.

7. A method for transporting a workpiece in which a workpiece inclining in a carriage is held and transported using the workpiece transporting apparatus according to claim 3, comprising:
- rotating the arm according to an inclining condition of the workpiece, thereby adjusting an inclining condition of the arm; and
- holding the workpiece by the holding portion.

\* \* \* \* \*